US006411068B1

(12) United States Patent
Willis

(10) Patent No.: US 6,411,068 B1
(45) Date of Patent: Jun. 25, 2002

(54) SELF-OSCILLATING SWITCHING REGULATOR

(75) Inventor: Scott C. Willis, Manassas, VA (US)

(73) Assignee: Bae Systems Information & Electronic Systems Integration, Inc., Rockville, MD (US)

(*) Notice: Subject to any disclaimer, the term of this patent is extended or adjusted under 35 U.S.C. 154(b) by 0 days.

(21) Appl. No.: 09/679,407

(22) Filed: Oct. 3, 2000

(51) Int. Cl.[7] .............................. G05F 1/40; G05F 3/16
(52) U.S. Cl. ........................................ 323/282; 323/313
(58) Field of Search .................................. 323/282, 281, 323/284, 285, 312, 313, 907

(56) References Cited

U.S. PATENT DOCUMENTS

| 3,629,622 A | * 12/1971 | Denenberg, Jr. ............ 323/284 |
| 3,660,753 A | 5/1972 | Judd et al. |
| 4,013,939 A | * 3/1977 | Biess et al. ................. 323/386 |
| 4,194,147 A | 3/1980 | Payne et al. |
| 5,498,995 A | * 3/1996 | Szepesi et al. |
| 5,617,016 A | 4/1997 | Borghi et al. |
| 5,731,694 A | 3/1998 | Wilcox et al. |
| 5,734,259 A | 3/1998 | Sisson et al. |
| 5,770,940 A | 6/1998 | Goder |
| 5,831,302 A | * 11/1998 | McIntyre .................... 323/313 |
| 5,831,471 A | * 11/1998 | Nakajima et al. ........... 327/540 |
| 5,841,643 A | * 11/1998 | Schenkel .................... 323/282 |
| 5,886,508 A | 3/1999 | Jutras |
| 5,917,313 A | 6/1999 | Callahan, Jr. |
| 5,949,222 A | 9/1999 | Buono |
| 5,982,161 A | 11/1999 | Nguyen et al. |

OTHER PUBLICATIONS

International IR Rectifier "Radiation Hardened Power MOSFET Thru–Hole (MO–036AB)," IRHG6110, 100V, Combination 2N–2P–Channel, RAD–Hard HEXFET, MOSFET Technology, pp. 1–14 (Mar. 2000).
Motorola Inc., "SWITCHMODE Power Supplies," *Reference Manual and Design Guide*, pp. 1–136, (May 1999).
Texas Instruments Incorporated, "Analog and Mixed Signal Products," *Analog Application Journal*, pp. ii–29, (Nov. 1999).
Watkins, Steve, "History and Development of Switched–Mode Power Supplies Pre 1987," pp. 1–21, 1987, 1998).

* cited by examiner

*Primary Examiner*—Rajnikant B. Patel
(74) *Attorney, Agent, or Firm*—Dicke, Billig & Czaja, P.A.

(57) ABSTRACT

A switching regulator connectable to a DC power supply includes a power switch coupled between a first node and an output node and having a control gate. An output voltage feedback circuit is coupled between the output node and a feedback node. A self-oscillating power switch control circuit is coupled to the first node, the feedback node, and the power switch control gate. The power switch control circuit compares a feedback voltage to a reference voltage and provides a first control voltage to the power switch control gate when the reference voltage exceeds the feedback voltage to turn on the power switch to raise the output voltage, and a second control voltage to the power switch control gate when the feedback voltage exceeds the reference voltage to turn off the power switch to lower the output voltage.

22 Claims, 4 Drawing Sheets

Vout (node 48, FIG 2) with 28VDC input (node 46, FIG.2)

Vout (node 48, FIG 2) with 70VDC input (node 46, FIG.2)

SELF-OSCILLATING SWITCHING REGULATOR

THE FIELD OF THE INVENTION

The present invention generally relates to power supplies, and more particularly to a radiation tolerant, self-oscillating switching regulator with hysteretic voltage control to convert a DC input voltage to an intermediate DC output voltage.

BACKGROUND OF THE INVENTION

Switching regulators typically provide near-constant voltage levels to voltage-sensitive devices. An example regulator includes a switch, an inductance-capacitance (LC) output filter to smooth the output, a feedback circuit, a comparator, and a control circuit. The control circuit selectively turns the switch on and off as necessary, based on a sample of a function of the output received by the comparator via the feedback circuit, to maintain the output voltage within a desired range.

Various types of switching regulators have been developed. One example includes a fixed frequency pulse width modulating (PWM) integrated circuit with a gate drive circuit and a derived voltage source for powering circuit components. The fixed frequency PWM circuit switches continuously, regardless of whether switching is necessary. Accordingly, the fixed frequency PWM circuit continuously generates undesirable electromagnetic interference and switching power losses. Conventional switching regulators typically require an additional regulator circuit to create a low voltage supply for the comparator to operate over a wide voltage range, resulting in an increased number of components and a corresponding increase in size, weight, and cost. Additionally, conventional switching regulators typically are not radiation hardened.

Many systems, particularly those in spacecraft, would benefit from a switching regulator that requires less space, operates reliably over a wide range of input voltages without the requirement of a separate regulator circuit to serve as a power supply, and has superior radiation tolerance.

SUMMARY OF THE INVENTION

The present invention provides a switching regulator connectable to a power supply. The switching regulator includes a first node connectable to the power supply, a feedback node, an output node, and a ground node. A power switch is coupled between the first node and the output node and has a power switch control gate. An output voltage feedback circuit is coupled between the output node and the feedback node, and to the ground node. A self-oscillating power switch control circuit is coupled to the first node, the ground node, the feedback node, and to the power switch control gate and compares a feedback voltage at the feedback node to a reference voltage. The self-oscillating power switch control circuit provides a first control voltage to the power switch control gate when the reference voltage exceeds the feedback node voltage to turn on the power switch to thereby raise the output node voltage to a desired level. The self-oscillating power switch control circuit provides a second control voltage to the power switch control gate when the feedback node voltage exceeds the reference voltage to turn off the power switch to thereby lower the output node voltage to a desired level.

In one embodiment of the switching regulator, an output filter is coupled between the power switch and the output node to smooth the output voltage waveform.

In one embodiment of the switching regulator, the self-oscillating power switch control circuit includes a voltage reference circuit to provide a desired reference voltage. In one aspect, the voltage reference circuit includes a first temperature-compensated voltage reference diode having an anode and a cathode. A constant current diode is coupled between the first node and the cathode of the first temperature-compensated voltage reference diode. A second temperature-compensated voltage reference diode has a cathode coupled to the anode of the first temperature-compensated and an anode coupled to a first terminal of a resistor whose second terminal is coupled to the ground node. Additionally, a capacitor is coupled between the cathode of the first temperature-compensated voltage reference diode and the anode of the second temperature-compensated voltage reference diode to reduce in-rush current by slowing the turning-on of the power switch.

In one embodiment of the switching regulator, the self-oscillating power switch control circuit includes a comparator circuit and a power switch biasing circuit. The comparator circuit compares the reference voltage to the feedback voltage and the power switch biasing circuit provides the first control voltage and the second control voltage to turn the power switch on and off.

In one embodiment, the comparator circuit comprises a first n-channel transistor with a gate coupled to a reference voltage node, a drain coupled to the power switch biasing circuit, and a source. A second n-channel transistor has a gate coupled to an output voltage reference node, a drain coupled to the power switch biasing circuit, and a source. A resistor has a first terminal connected to the sources of both n-channel transistors and a second terminal connected to the ground node.

In one embodiment, the power switch biasing circuit comprises a first p-channel transistor with a gate coupled to both the drain of the first n-channel in the comparator circuit and to a first terminal of a first resistor whose second terminal is coupled to the input node, a source coupled to the power switch control gate, and a drain coupled to the anode of the second temperature-compensated voltage reference diode in the voltage reference circuit. A second p-channel transistor has a source coupled to the input node, a drain connected to the power switch control gate, and a control gate. A second resistor has a first terminal coupled to the input node and a second terminal coupled to the gate of the second p-channel transistor. A third resistor has a first terminal coupled to the gate of the second p-channel transistor, and a second terminal coupled to the drain of the second n-channel transistor in the comparator circuit. A fourth transistor has a first terminal coupled to the input node, and a second terminal coupled to the power switch control gate.

One aspect of the present invention provides a method for providing a desired second DC voltage level from a power supply having a first DC voltage level. The method includes receiving the first DC voltage level from the power supply and comparing the first DC voltage level from the power supply to the desired second DC voltage level. A first control voltage level is provided to a power switch control gate to cause the power switch to turn on if the first DC voltage level is less than or equal to the desired second DC voltage level to thereby provide the first DC voltage level at an output node. A first control voltage level and a second control voltage level are alternately provided to the power switch control gate to cause the power switch to turn on and off if the first DC voltage level is greater than the desired second DC voltage, thereby turning the power switch on and off at an appropriate switching frequency to thereby provide the desired second DC voltage level.

In one embodiment, the present invention provides a switching regulator control circuit that utilizes only four active devices, such as metal-oxide semiconductor field-effect transistors (MOSFETs). In one embodiment, the switching regulator includes a comparator, a driver for a MOSFET power switch, and a control circuit which provides hysteresis voltage control.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
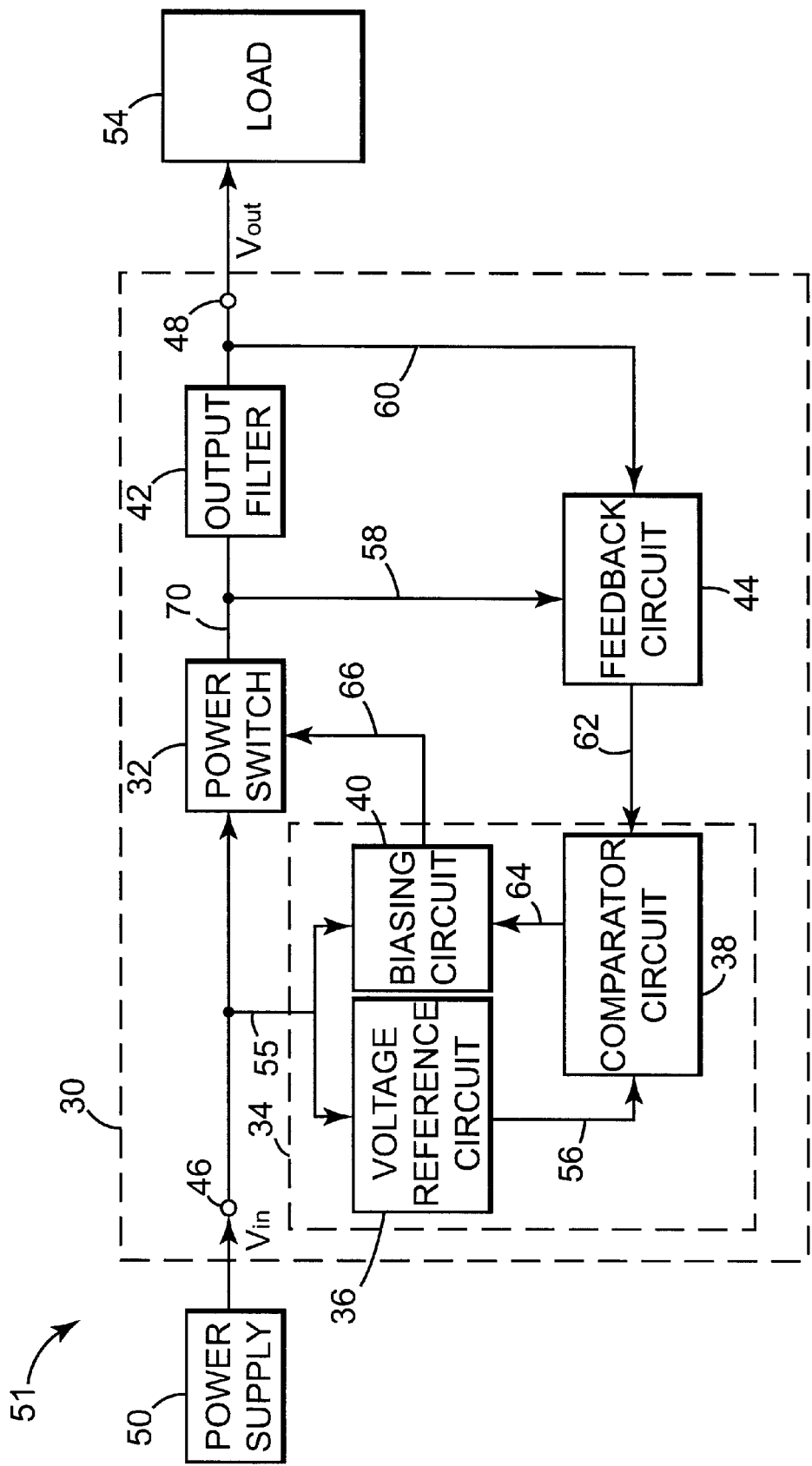
FIG. 1 is a block diagram of a power source having a switching regulator according to the present invention and a corresponding DC power supply.

A switching regulator according to the present invention is illustrated generally at 30 in FIG. 1. Switching regulator 30 includes a power switch 32, a self-oscillating power switch control circuit 34, an output filter 42, a feedback circuit 44, an input node 46, and an output node 48. The power switch control circuit 34 includes a voltage reference circuit 36, a comparator circuit 38 and a power switch biasing circuit 40.

Switching regulator 30 is designed to provide a desired DC output voltage level at node 48 to thereby provide the desired DC output voltage level to a load 54 coupled to node 48. The load 54 can be any load requiring a DC voltage to operate including, but not limited to, a DC converter, a headlight, and electronic equipment. The desired DC output voltage level at node 48 is less than or equal to the DC voltage level supplied by a power supply 50 coupled to input node 46. Together, switching regulator 30 and power supply 50 form a power source 51 for providing a desired DC output voltage level to load 54.

If the DC voltage level of power supply 50 is less than the desired output voltage level at output node 48, switching regulator 30 operates as a pass-through circuit and provides the same DC voltage level output at node 48 as supplied to input node 46 by power supply 50. If the DC voltage level of power supply 50 is greater than the desired output voltage level at output node 48, switching regulator 30 operates as a voltage regulator and converts the voltage level at input node 46 down and provides the desired output voltage level at output node 48. Power supply 50 can be any one of a number of DC power sources including, but not limited to, a standard DC power supply, a rectified AC supply, battery, or solar cell.

Voltage reference circuit 36 is coupled to input node 46 via a line 55 and receives the DC voltage level from power supply 50 via line 55. Voltage reference circuit 36 provides an input voltage reference to comparitor circuit 38 via a line 56. Power switch 32 is coupled between input node 46 and a node 70. Output filter 42 is coupled between node 70 and output node 48. Output filter 42 filters the output of power switch 32 to provide a smooth output voltage at output node 48.

Feedback circuit 44 is coupled to output node 48 via a line 60 and to the output of power switch 32 via a line 58. Feedback circuit 44 provides an output voltage reference level to comparitor circuit 38 via a line 62. Comparitor circuit 38 compares the input voltage reference level received via line 56 to the output voltage reference level received via line 62. When the reference voltage level exceeds the output voltage reference level, comparitor circuit 38 provides a first comparator output voltage level to a biasing circuit 40 via a line 64, causing biasing circuit 40 to send a first control voltage level to power switch 32 via line 66, to thereby turn on power switch 32. When the output voltage reference level received via line 62 exceeds the input voltage reference level received via line 56, comparitor circuit 38 provides a second comparator output control voltage level to biasing circuit 40 via line 64, causing biasing circuit 40 to send a second control voltage level to power switch 32 via line 66, to thereby turn off power switch 32.

Figure 2:
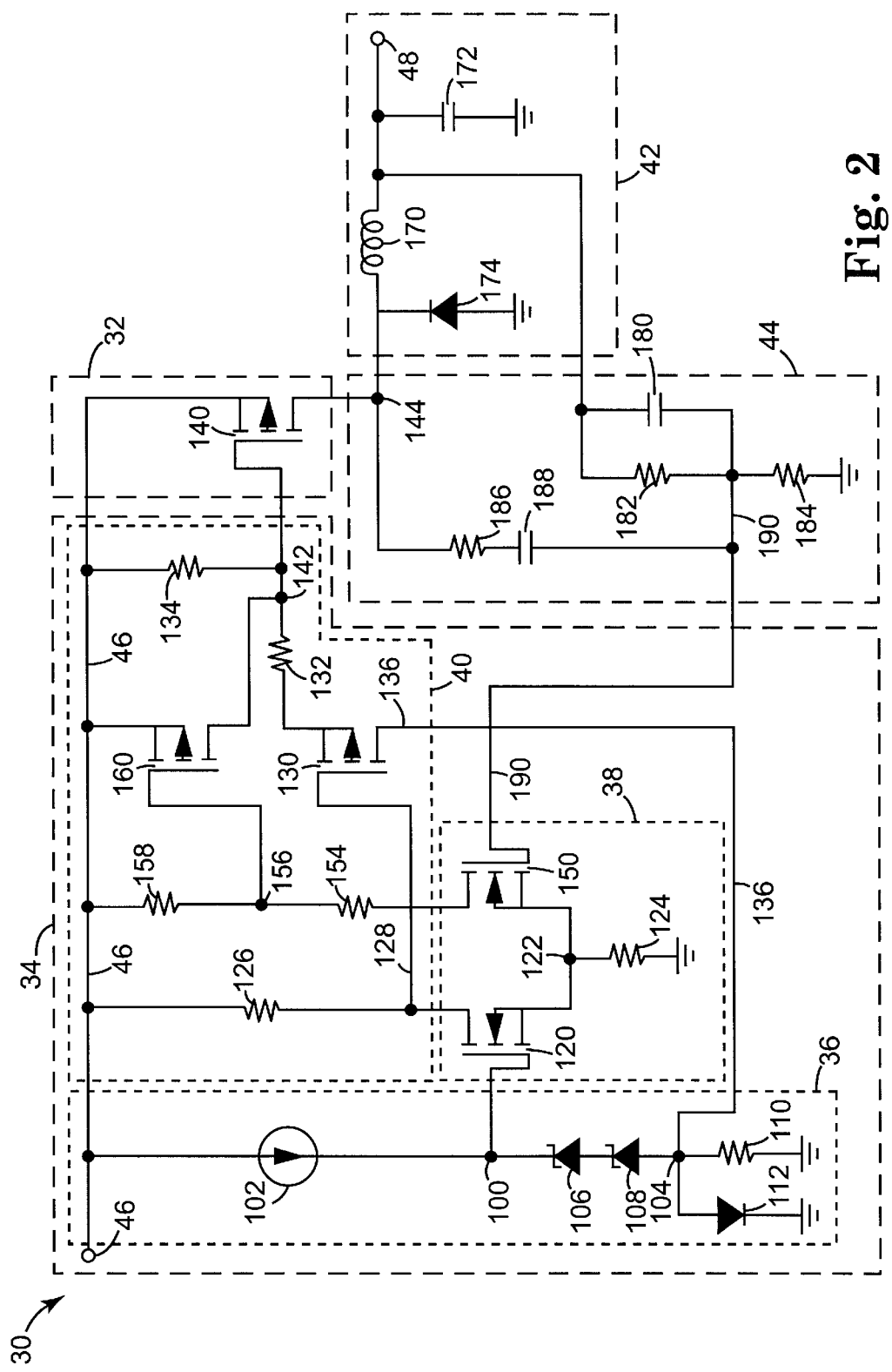
FIG. 2 is a schematic diagram of one embodiment of the switching regulator of FIG. 1.

One embodiment of switching regulator 30 according to the present invention is illustrated in schematic design form in FIG. 2, and is configured and coupled as described below.

Reference voltage circuit 36 includes a constant current diode 102 coupled between an input node 46 and a reference voltage node 100. A first temperature compensated voltage reference diode 106 has a cathode coupled to reference voltage node 100 and an anode. A second temperature compensated voltage reference diode 108 has a cathode coupled to the anode of the first diode 106 and an anode coupled to a node 104. A resistor 110 has a first terminal coupled to node 104 and a second terminal coupled to the ground node. A diode 112 is coupled in parallel with resistor 110, and has an anode coupled to node 104 and a cathode coupled to the ground node.

Comparator circuit 38 comprises a first n-channel metal-oxide semiconductor field-effect transistor (MOSFET) 120 and a second n-channel MOSFET 150 coupled to form a differential amplifier pair. The source of n-channel MOSFET 120 and the source of n-channel MOSFET 150 are both coupled to a first terminal of a resistor 124, whose second terminal is coupled to the ground node. The gate of the n-channel MOSFET 120 is coupled to reference voltage node 100, and the gate of the second n-channel MOSFET 150 is coupled to a feedback voltage node 190. The drain of both n-channel MOSFET 130 and n-channel MOSFET 150 are coupled to biasing circuit 40 and provide control signals for proper biasing of power switch 140.

Biasing circuit 40 consists of a first p-channel MOSFET 130 and a second p-channel MOSFET 160 and various resistors to achieve proper biasing voltages. The gate of first p-channel MOSFET 130 is coupled to the drain of n-channel MOSFET 120 via a line 128, a drain is coupled to node 104 via line 136, and a source coupled to a first terminal a resistor 132 whose second terminal is coupled to a control gate 142 of p-channel MOSFET 140. Second p-channel MOSFET 160 has a gate coupled to node 156, a source coupled to input node 46 and a drain coupled to the control gate of power switch 140. Additionally, a resistor 158 is coupled between input node 46 and the control gate of p-channel MOSFET 160, a resistor 154 is coupled between node 156 and the drain of n-channel MOSFET 150 and a resistor 126 is coupled between the input node 46 and the drain of n-channel MOSFET 120. Furthermore, a resistor 134 is coupled between input node 46 and the control gate 142 of p-channel MOSFET 140.

Power switch 32 comprises a p-channel MOSFET 140 with a control gate connected 142, a source coupled to input node 46, and a drain coupled to both the output filter 42 and the feedback circuit 44 at node 144.

Output filter 42 comprises an inductor 170 coupled between node 144 and output node 48, a capacitor 172 coupled between output node 48 and the ground node, and a free-wheeling diode 174 with a cathode connected to node 144 and an anode coupled to the ground node. Free-wheeling diode 174 provides a current path for inductor 170 when p-channel MOSFET 140 is off.

Feedback circuit 44 comprises a capacitor 180 with a first terminal coupled to output node 48 and a second terminal coupled to output voltage reference node 190, and a resistor 182 coupled in parallel with capacitor 180. Additionally, a resistor 184 has a first terminal coupled to output reference voltage node 190 and a second terminal coupled to the ground node. Furthermore, a resistor 186 has a first terminal coupled to node 144 and a second terminal coupled to a first terminal of a capacitor 188, whose second terminal is coupled to the output reference voltage node 190.

Power controller 30 operates as follows to provide a desired DC output voltage level at output node 48 that is less than or equal to the DC voltage provided by a power supply at input node 46. With no voltage present at input node 46, all devices are off. Resistor 134 coupled between input node 40 and the gate of power switch 140 discharges the gate source capacitance of power switch 140 to make sure that the default state is off.

When a DC input voltage is applied to input node 46 by a power supply, current flows through constant current diode 102 from input node 46 to reference voltage node 100. The input voltage also biases temperature compensated voltage reference diodes 106 and 108, resulting in current flow through resistor 108 and diode 110. The current flow through temperature compensated voltage reference diodes 106 and 108, and resistor 110 establishes a desired voltage reference level at voltage reference node 100 while the voltage level at feedback reference voltage node 190 is at zero. The reference voltage level established at reference voltage node 100 is determined by the characteristics and values selected for constant current diode 102, temperature compensated diodes 106 and 108, and resistor 110.

With the desired reference voltage level present at reference voltage node 100 and the voltage level at feedback reference node 190 at zero, n-channel MOSFET 120 is turned on resulting in current flow in the path from input node 40 through resistor 126, n-channel MOSFET 120, and resistor 124 to ground. The current through resistor 124 is established by subtracting the threshold voltage of n-channel MOSFET 120 from the voltage level at reference voltage node 100 and dividing the result by the value of resistor 124. The same current flows through resistor 126 since n-channel MOSFET 150 is off. The current flow through resistor 126 results in a voltage level being applied via line 128 to the control gate of p-channel MOSFET 130, thus turning it on and causing current to flow in the path from input node 40 through resistor 134, resistor 132, p-channel MOSFET 130, and resistor 110 to ground. The current flow through resistors 132 and 110 results in a voltage level being applied to control gate 142 of power switch 140, thereby turning it on.

With power switch 140 on, the DC input voltage level provided by a power supply 50 at input node 46 is applied across inductor 170, causing current to begin to flow. As the current level flowing through inductor 170 begins to rise, the output voltage across capacitor 172 begins to rise. Simultaneously, a current flows from the output node 48 to feedback circuit 44 via line 178, resulting in the voltage level at the feedback reference voltage node 190 to begin to rise.

In one embodiment, as the voltage level at feedback voltage node 190 begins to rise, switching regulator 30 responds in one of two ways, depending upon the relative magnitudes of the DC voltage level supplied to input node 46 by power supply 50 and the desired output voltage set-point. The desired output voltage level set-point is established by multiplying the value of the reference voltage level at node 100 by the quantity (1+(Resistor 182/Resistor 184)).

In the first response, switching regulator 30 functions as a "pass-through" circuit. If the DC voltage level supplied by power supply 50 at input node 46 is less than the desired output voltage level set-point, the feedback voltage level at feedback reference voltage node 190 will rise to a maximum level that is less than the reference voltage at reference voltage node 100. Consequently, n-channel MOSFET 150 will never be turned on. Thus, power switch 140 will remain on and have a 100% duty cycle. Under these conditions, switching regulator 30 functions as a pass-through circuit, resulting in the output voltage level at output node 48 being equivalent to the DC voltage level being supplied by the power supply 50 at input node 46.

In the second response, switching regulator 30 functions as a voltage regulator. If the DC voltage level supplied by power supply 50 at input node 46 is greater than the desired output voltage level setpoint, the voltage level at feedback reference voltage node 190 will continue to rise until it eventually exceeds the reference voltage level at reference voltage node 100.

When the feedback voltage level exceeds the reference voltage level, n-channel MOSFET 120 turns off and n-channel MOSFET 150 turns on. This causes the current flowing through resistor 126 to cease and instead causes current to flow in the path from input node 46 through resistor 158, resistor 154, n-channel MOSFET 150, and resistor R24 to ground. This removes the voltage from the control gate of p-channel MOSFET 130 turning it off and terminating the current flowing from input node 46 through resistor 134, resistor 132, p-channel MOSFET 130 and resistor 124.

With p-channel MOSFET 130 off, a voltage is now applied to the gate of p-channel MOSFET 160 at node 156, causing p-channel MOSFET 160 to turn on. This discharges the gate-to-source voltage of power switch 140, causing it to turn off, consequently eliminating current flow to output filter 42 and feedback circuit 34. Capacitor 172 then begins to discharge, causing the voltage level at feedback reference voltage node 190 to begin to decrease. When the voltage level at feedback reference voltage node 190 falls below the voltage level at reference voltage node 100, n-channel MOSFET 150 is turned off and n-channel MOSFET 120 is once again turned on, and the entire process described above repeats itself, and power switch control circuit 34 will begin to self-oscillate.

Once self-oscillating, power switch control circuit 34 will turn power switch 140 on and off at a duty cycle of Vout/Vin, and thereby maintain the output voltage level at output node 48 at the desired set-point. Under these conditions, switching power regulator 30 functions as a regulator and converts the DC voltage level supplied by power supply 50 to the desired intermediate voltage level at output node 48.

One aspect of the design involves the charging current for p-channel MOSFET 140's gate capacitance. As p-channel MOSFET 130 turns on, the charging current for p-channel MOSFET 140's gate capacitance flows through resistor 110, creating a slight increase in voltage across resistor 110. The slight increase in voltage across resistor 110 in-turn results in a slight increase in the voltage reference level at voltage reference node 100.

The slight increase in voltage provides positive feedback for fast switching action to change states with a minimum number of parts. The slight increase in voltage also provides a regulation hysteresis window for the self-oscillating power regulating process to function. P-channel MOSFET 140's gate capacitance charging current flowing through resistor 110 is largest at the beginning of a cycle, and gradually diminishes to a minimum value determined by dividing the magnitude of the gate-to-source voltage of MOSFET 140 by the value of resistor 134. The minimum current value establishes a minimum hysteresis voltage value across resistor 110, which is added to the reference voltage established by voltage reference diodes 106 and 108. Diode 112 clamps the voltage to a maximum value to ensure a proper biasing voltage at node 100 for n-channel MOSFET 120.

Figure 3:
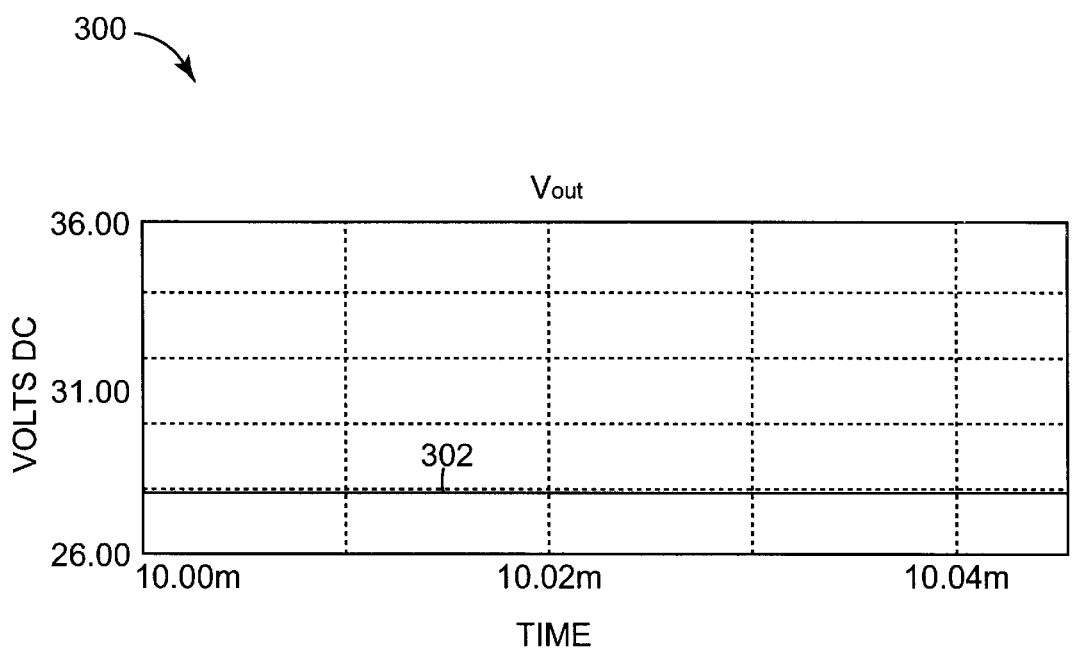
FIG. 3 is a graphical representation of an output voltage waveform provided by the switching regulator of FIG. 2 when a DC voltage level from the corresponding power supply is less than a desired DC output voltage level.
Figure 4:
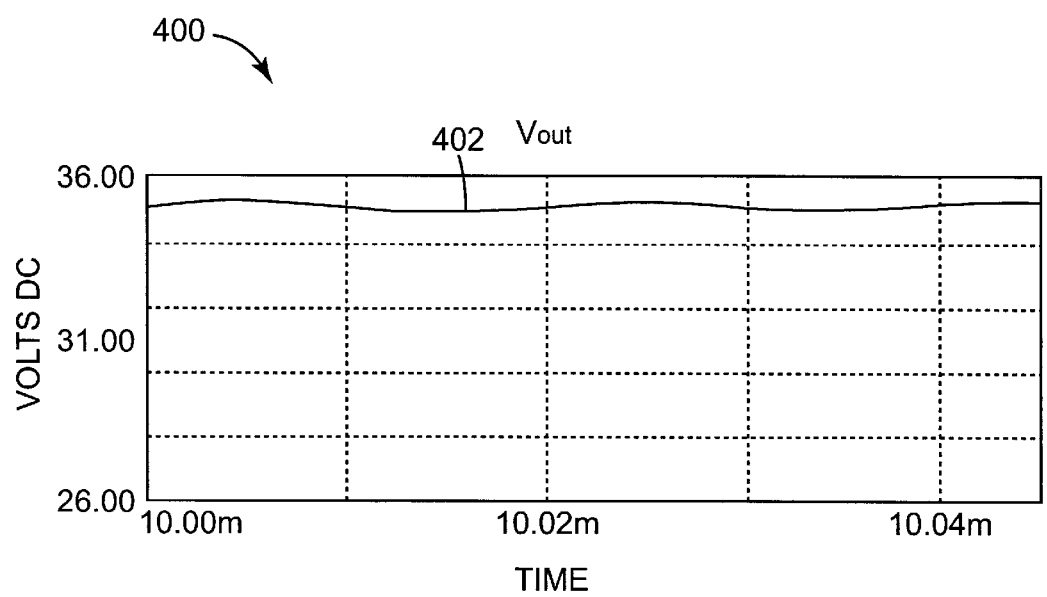
FIG. 4 is a graphical representation of an output voltage waveform provided by the switching regulator of FIG. 2 when the corresponding DC voltage level from the power supply is greater than a desired DC output voltage level.

FIG. 3 and FIG. 4 represent exemplary output voltage waveforms for the two scenarios described above for the embodiment of FIG. 2 having suitable example component values described in the Table 1 below:

TABLE 1

| | |
|---|---|
| Constant current diode 102: | 0.56mA |
| Temperature compensated voltage reference diode 106: | 6.4V |
| Temperature compensated voltage reference diode 108: | 6.4V |
| Resistor 110: | 100 |
| Resistor 124: | 10k |
| Resistor 126: | 15k |
| Resistor 132: | 10 |
| Resistor 134: | 10k |
| Resistor 154: | 10k |
| Resistor 158: | 5k |
| Inductor 170: | 100uh |
| Output capacitor 172: | 27uf |
| Capacitor 180: | 0.002uf |
| Resistor 182: | 2.1k |
| Resistor 184: | 1.28k |
| Resistor 186: | 600k |
| Capacitor 188: | 0.1uf |

With the specific example component values indicated in above Table I, the switching regulator is tuned to provide an output voltage level of 35 VDC at output node 48. FIG. 3 represents a graph 300 of the output voltage level at output node 48 versus time when the standard DC power supply 50 is supplying 28VDC to input node 46. As curve 302 demonstrates, the output voltage level at node 48 is equivalent to the voltage level at input node 46. FIG. 4 represents a graph 400 of the output voltage level at output node 48 versus time when the standard DC power supply 50 is supplying 70 VDC to input node 46. As curve 402 indicates, the output voltage at node 48 is slightly sinusoidal with the variation from 35 VDC resulting from the switching delay inherent to the circuitry and a frequency equivalent to the duty cycle of power switch.

In conclusion, switching regulator 30 of the present invention reduces undesirable switching losses and electromagnetic interference by switching only when necessary. Moreover, power switch control circuit 34 reduces space requirements and increases radiation tolerance by using only four active components and not requiring a separate regulator circuit to provide reliable operation over a wide range of input voltages. Additionally, the present invention can be used with a wide variety of input power sources. These characteristics are advantageous in many applications, including spacecraft, where radiation tolerance, flexibility, and reduced size and weight are especially valuable.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A switching regulator connectable to a power supply having a DC voltage, the switching regulator comprising:
   a first node connectable to the power supply;
   a feedback node;
   an output node;
   a ground node;
   a power switch coupled between the first node and the output node and having a power switch control gate;
   an output voltage feedback circuit coupled between the output node and the feedback node, and to ground node; and
   a self-oscillating power switch control circuit coupled to the first node, the ground node, the feedback node, and to the power switch control gate, wherein the power switch control circuit includes a voltage reference circuit which provides a desired reference voltage, wherein the power switch control circuit compares a feedback voltage at the feedback node to the desired reference voltage, provides a first control voltage to the power switch control gate when the desired reference voltage exceeds the feedback node voltage to turn on the power switch to thereby raise the output node voltage to a desired level, and provides a second control voltage to the power switch control gate when the feedback node voltage exceeds the desired reference voltage to turn off the power switch to thereby lower the output node voltage to a desired level.

2. The switching regulator of claim 1 wherein an output filter circuit is coupled between the power switch and the output. node.

3. The switching regulator of claim 1, wherein the voltage reference circuit comprises:
   a first temperature-compensated voltage reference diode having an anode and a cathode;

a constant current diode coupled between the first node and the cathode of the first temperature-compensated voltage reference diode;

a second temperature-compensated voltage reference diode having a cathode coupled to the anode of the first temperature-compensated voltage reference diode, and having an anode; and a resistor having a first terminal coupled to the anode of the second temperature-compensated voltage reference diode and a second terminal coupled to the ground node.

4. The switching regulator of claim 3, wherein the voltage reference circuit further comprises a capacitor is coupled between the cathode of the first temperature-compensated voltage reference diode and the anode of the second temperature-compensated voltage reference diode to reduce in-rush current.

5. The switching regulator of claim 1, wherein the self-oscillating power switch control circuit includes a comparator circuit to compare the desired reference voltage to the feedback . voltage.

6. The switching regulator of claim 1, wherein the self-oscillating power switch control circuit includes a power switch biasing circuit which provides the first control voltage and the second control voltage to turn the power switch on and off.

7. The switching regulator of claim 6, wherein the comparator circuit comprises:

a first transistor with a gate coupled to a reference voltage node, a drain coupled to the power switch biasing circuit, and a source;

a second transistor with a gate coupled to an output voltage reference node, a drain coupled to the power switch biasing circuit, and a source; and a resistor with a first terminal coupled to both the source of the first n-channel transistor and to the source of the second n-channel transistor, and a second terminal coupled to the ground node.

8. The comparator circuit of claim 7, wherein the first transistor is an n-channel transistor and the second transistor is an n-channel transistor.

9. The switching regulator of claim 6, wherein the power switch biasing circuit comprises:

a first transistor having a gate coupled to both the drain of the first transistor in the comparator circuit and to a first terminal of a first resistor whose second terminal is coupled to the input node, a source coupled to a first terminal of a resistor whose second terminal is coupled to the power switch control gate, and a drain coupled to the anode of the second temperature compensated voltage reference diode in the voltage reference circuit;

a second transistor with a source coupled to the input node, a drain connected to the power switch control gate, and a control gate;

a second resistor with a first terminal coupled to the input node, and a second terminal coupled to the gate of the second transistor;

a third resistor with a first terminal coupled to the gate of the second transistor, and a second terminal coupled to the drain of the second transistor in the comparator circuit; and a fourth resistor with a first terminal coupled to the input node, and a second terminal coupled to the power switch control gate.

10. The biasing circuit of claim 9, wherein the first transistor is a p-channel transistor and the second transistor is a p-channel transistor.

11. A self-oscillating power switch control circuit connectable to a power supply having a DC voltage and to a power switch having a source coupled to the power supply, a drain which provides an output voltage, and a control gate, the power switch control circuit comprising:

a voltage reference circuit receiving the DC voltage from the power supply and providing a desired reference voltage;

a comparator circuit receiving the desired reference voltage and a feedback voltage representative of the power switch output voltage, providing a comparator output signal having a first comparator output voltage level when the desired reference voltage exceeds the feedbacks voltage and a second comparator output voltage level when the feedback voltage exceeds the desired reference voltage.

a biasing circuit receiving the comparator output signal, providing a first control voltage to the power switch control gate in response to the comparator output signal being at the first comparator output voltage level to turn on the power switch to thereby raise the power switch output voltage, and providing a second control voltage to the power switch control gate in response to the comparator output signal being at the second comparator output voltage level to turn off the power switch to thereby lower the power switch output voltage.

12. The power switch control circuit of claim 11, wherein the biasing circuit includes a transistor coupled to the power switch that turns on in response to the comparator output signal being at the first comparator output voltage level.

13. The power switch control circuit of claim 12, wherein the voltage reference circuit slightly increases the desired reference voltage in response to the transistor being turned on.

14. The power switch control circuit of claim 11, wherein the voltage reference circuit comprises:

a first temperature-compensated voltage reference diode having an anode and a cathode;

a constant current diode coupled between the first node and the cathode of the first temperature-compensated voltage reference diode;

a second temperature-compensated voltage reference diode having a cathode coupled to the anode of the first temperature-compensated voltage reference diode, and having an anode; and a resistor having a first terminal coupled to the anode of the second temperature-compensated voltage reference diode and a second terminal coupled to the ground node.

15. The power switch control circuit of claim 14, wherein the voltage reference circuit further comprises a capacitor is coupled between the cathode of the first temperature-compensated voltage reference diode and the anode of the second temperature-compensated voltage reference diode to reduce in-rush current.

16. The power switch control circuit of claim 11, wherein the comparator circuit comprises:

a first transistor with a gate coupled to a reference voltage node, a drain coupled to the power switch biasing circuit, and a source;

a second transistor with a gate coupled to an output voltage reference node, a drain coupled to the power switch biasing circuit, and a source; and a resistor with a first terminal coupled to both the source of the first n-channel transistor and to the source of the second n-channel transistor, and a second terminal coupled to the ground node.

17. The power switch control circuit of claim 11, wherein the power switch biasing circuit comprises:

a first transistor having a gate coupled to both the drain of the first transistor in the comparator circuit and to a first terminal of a first resistor whose second terminal is coupled to the input node, a source coupled to a first terminal of a resistor whose second terminal is coupled to the power switch control gate, and a drain coupled to the anode of the second temperature compensated voltage reference diode in the voltage reference circuit;

a second transistor with a source coupled to the input node, a drain connected to the power switch control gate, and a control gate;

a second resistor with a first terminal coupled to the-input node, and a second terminal coupled to the gate of the second transistor;

a third resistor with a first terminal coupled to the gate of the second transistor, and a second terminal coupled to the drain of the second transistor in the comparator circuit; and a fourth resistor with a first terminal coupled to the input node, and a second terminal aim coupled to the power switch control gate.

18. A method of providing a desired second DC voltage level from a power supply having a first DC voltage level, the method comprising:

receiving the first DC voltage level from the power supply;

comparing the first DC voltage level from the power supply to the desired second DC voltage level;

providing a first control voltage level to a power switch control gate, to cause the power switch to turn on if the first DC voltage level is less than or equal to the desired second DC voltage level to thereby provide the first DC voltage level at an output node; and alternately providing a first control voltage level and a second control voltage level to the power switch control gate to cause the power switch to turn on and off if the first DC voltage level is greater than the desired second DC voltage, thereby turning the power switch on and off at an appropriate switching frequency to thereby provide the desired second DC voltage level.

19. The method of claim 18, wherein the desired second DC voltage level is based on a desired reference voltage.

20. The method of claim 18, further comprising: providing a first comparator output voltage level when the DC reference voltage level exceeds the DC feedback voltage level, and a second comparator output voltage level when the DC feedback voltage level exceeds the DC reference voltage level.

21. The method of claim 18, further comprising providing a first biasing circuit output voltage level when the DC reference voltage exceeds the DC feedback voltage, and providing a second biasing circuit output voltage level when the DC feedback voltage exceeds the DC reference voltage.

22. A power source comprising:

a power supply having a DC voltage; and a switching regulator coupled to the power supply, the switching regulator comprising:

a first node connectable to the power supply;

a feedback node;

an output node;

a ground node;

a power switch coupled between the first node and the output node and having a power switch control gate;

an output voltage feedback circuit coupled between the output node and the feedback node, and to ground node; and a self-oscillating power switch control circuit coupled to the first node, the ground node, the feedback node, and to the power switch control gate, wherein the power switch control circuit includes a voltage reference circuit which provides a desired reference voltage, wherein the power switch control circuit compares a feedback voltage at the feedback node to the desired reference voltage, provides a first control voltage to the power switch control gate when the desired reference voltage exceeds the feedback node voltage to turn on the power switch to thereby raise the output node voltage to a desired level, and provides a second control voltage to the power switch control gate when the feedback node voltage exceeds the desired reference voltage to turn off the power switch to thereby lower the output node voltage to a desired level.

* * * * *

UNITED STATES PATENT AND TRADEMARK OFFICE
CERTIFICATE OF CORRECTION

PATENT NO. : 6,411,068 B1
DATED : June 25, 2002
INVENTOR(S) : Scott C. Willis

It is certified that error appears in the above-identified patent and that said Letters Patent is hereby corrected as shown below:

Column 8,
Line 63, please delete "output.node" and insert -- output node. --.

Column 9,
Line 21, please delete "feedback.voltage" and insert -- feedback voltage. --.

Column 10,
Line 13, please delete "feedbacks" and insert -- feedback --.

Signed and Sealed this

Twelfth Day of August, 2003

JAMES E. ROGAN
*Director of the United States Patent and Trademark Office*